H. CSANYI.
FILM FEEDING MECHANISM.
APPLICATION FILED DEC. 29, 1915.
1,241,200.
Patented Sept. 25, 1917.
2 SHEETS—SHEET 1.
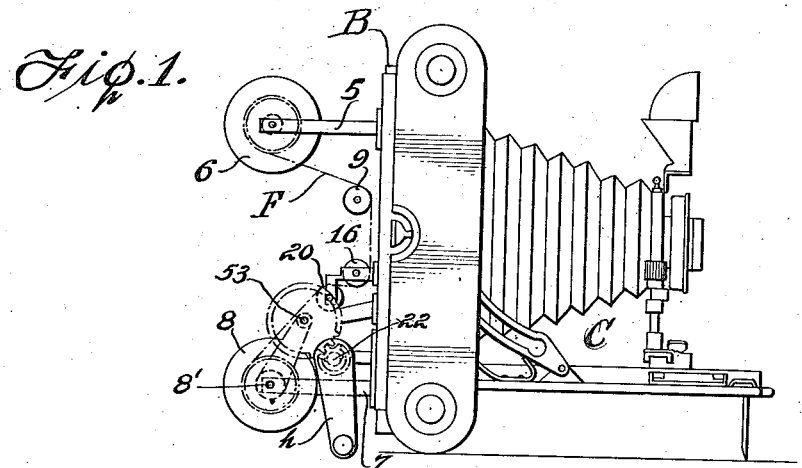
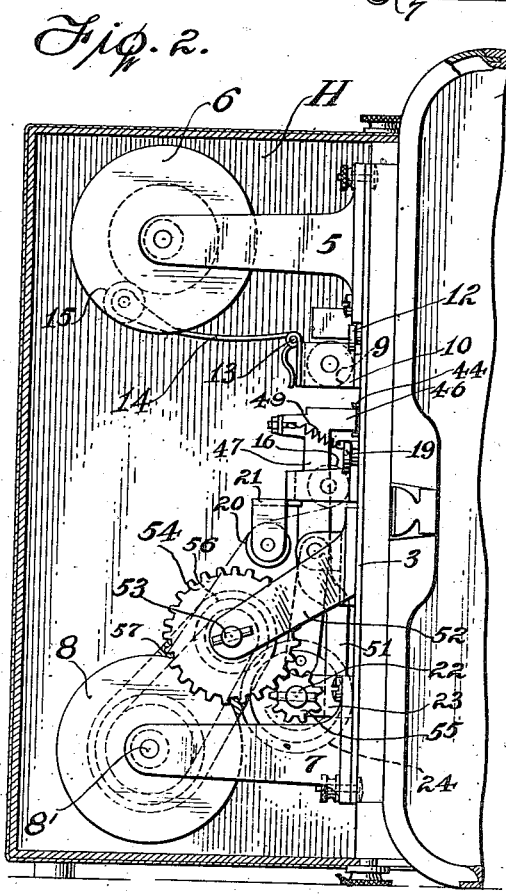
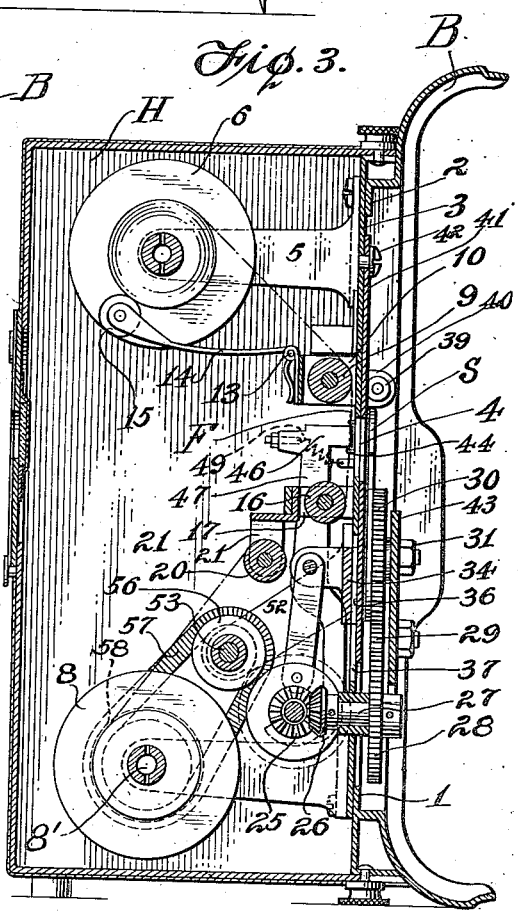
Witnesses:
Inventor
Henry Csanyi
By his Attorneys
Meyers, Cushman & Rea

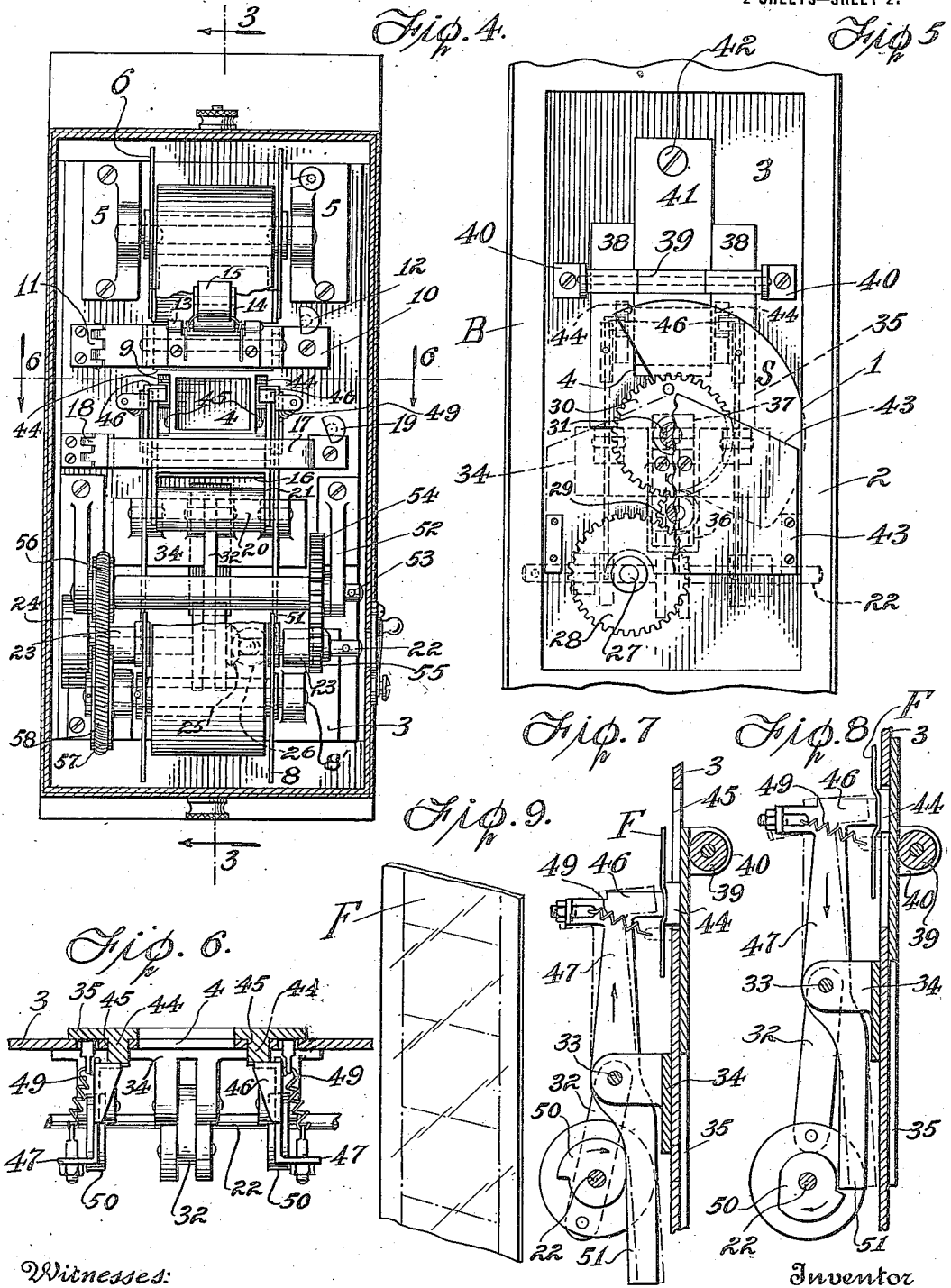

UNITED STATES PATENT OFFICE.

HENRY CSANYI, OF NEW YORK, N. Y.

FILM-FEEDING MECHANISM.

1,241,200.                           Specification of Letters Patent.   Patented Sept. 25, 1917.

Original application filed July 29, 1915, Serial No. 42,523. Divided and this application filed December 29, 1915. Serial No. 69,190.

*To all whom it may concern:*

Be it known that I, HENRY CSANYI, a subject of the King of Hungary, residing at New York, in the county and State of New York, have invented new and useful Improvements in Film-Feeding Mechanism, of which the following is a specification.

This invention relates to a film feeding mechanism, and is in the nature of a division of my earlier application for a motion picture apparatus filed July 29, 1915, Serial No. 42,523.

In the present instance I have shown my film feeding mechanism as employed in connection with a motion picture apparatus such as forms the subject matter of my earlier application aforesaid, but I wish it to be understood that the invention is not limited in its application to this particular apparatus as it may be used in connection with any motion picture or photographic apparatus as may be deemed desirable.

In carrying out the present invention it is my purpose to provide a novel form of film feeding mechanism which is adapted to frictionally engage and feed the film at predetermined times, my mechanism enabling me to employ a film having imperforate edges. In other words, I dispense with the usual rows of perforations located adjacent the edges of the ordinary motion picture film, and of course under such conditions I also dispense with the use of the star-wheel mechanism for engaging the perforations of the ordinary film.

Furthermore, it is my purpose to provide a film feeding mechanism which will embody the desired features of simplicity, efficiency and reliability and through the agency of which the film may be smoothly, evenly and positively fed for the intended purpose.

With the above recited objects and others of a similar nature in view my invention consists in the construction, combination and arrangement of parts set forth in and falling within the scope of the appended claims.

In the accompanying drawings,

Figure 1 is a view in side elevation of a conventional form of camera equipped with my invention, the latter being illustrated more or less diagrammatically.

Fig. 2 is a view in side elevation of my film feeding mechanism, the casing or housing being shown in section.

Fig. 3 is a vertical longitudinal sectional view taken on the line 3—3 of Fig. 4.

Fig. 4 is a view in rear elevation of the back portion of the photographic apparatus and showing my film feeding mechanism, the back of the casing or housing being removed.

Fig. 5 is a view of the inside face of the back of a camera and showing the shutter and certain mechanism operating in conjunction therewith.

Fig. 6 is a cross sectional view taken on the line 6—6 of Fig. 4.

Fig. 7 is a detail view of a portion of the film feeding mechanism and showing the latter in position just prior to the release of the film.

Fig. 8 is a similar view showing the film as engaged and ready to be moved by certain parts of the film feeding mechanism.

Fig. 9 is a perspective view of a portion of the film.

Before entering into a detailed description of my invention I will briefly state that it embodies, among other features, a device for frictionally and intermittently engaging the edges of a preferably imperforate film to draw the latter past an opening controlled by the shutter. This shutter is preferably driven from the same source of power which actuates the film feeding mechanism so that when the shutter is open the film stands still while, when the shutter closes, the film is frictionally engaged by the film moving devices and is drawn or caused to travel past the shutter controlled opening as will hereinafter be more fully described.

Referring now to the accompanying drawings in detail, in Fig. 1 the letter C indicates a film camera of any ordinary and well known type. As the camera shown herein is what is commonly known as a folding pocket kodak, it is merely conventionally illustrated. The back of the camera is shown at B and this back also forms the front wall of the housing H within the confines of which the film feeding mechanism is disposed. The back B of the camera is preferably of skeleton form as will be seen by reference to Fig. 5 and has a relatively large rectangular opening 1 cut therein. This opening 1 is surrounded by a suitable rectangular frame 2 which projects from the outer wall of the back. Suitably fastened to this frame 2 is a plate 3 having an opening 4 cut therein and past which opening the film travels for exposure as hereinafter described, this opening being controlled by the shutter S. Bolted to the plate 3 adjacent the top edge thereof is a pair of bracket arms 5 forming bearings for the film unwinding spool 6. Likewise adjacent the bottom of the plate 3, or below the shutter opening, I provide a pair of bracket arms 7 which form a bearing for the shaft 8' of the film winding spool 8 on which the film is adapted to be wound after it is fed past the shutter controlled opening. In using the spools 6 and 8, the film, which is shown at F, is fastened to and wrapped about the upper spool 6 and is then past downward beneath the roller 9 carried by the upper clamping member 10, this latter member being hinged at one end as at 11 to the back plate 3 and at its opposite, or free end, it is adapted to be held against movement by the thumb catch 12. To this clamping member 10 is hinged, as at 13, a spring tensioned arm 14 which is equipped at its free end with a roller 15 adapted to bear against the film on the spool 6 and maintain such film at the proper tension, this arm 14 at the same time acting as a guide for the film as the latter reels off the spool 6. From the roller 9 of the clamping arm 10 the film is drawn downward across the shutter opening 4. The film then passes beneath the clamping feet 46 of the film feeding mechanism, as will be hereinafter more fully described, and then passes beneath the roller 16 of the clamping bar 17, the latter being hinged at one end as at 18 to the back plate 3, and at its opposite end is detachably fastened by means of the thumb catch 19. The film is then trained over the guide roller 20 carried by the bracket 21 which, in the present instance, is attached to the clamping bar 17. From this guide roller 20 the film passes to the lower or winding spool 8 and is fastened thereto in the usual manner.

For the purpose of feeding the film and at the same time operating the shutter S at proper intervals I employ the following mechanism:

The numeral 22 indicates a power shaft which is journaled in a pair of small brackets 23 affixed to the back plate 3, and one end of this shaft may be provided with a detachable crank or handle h for the purpose of turning the shaft and thus actuating the film moving and shutter operating mechanisms. The opposite end of the shaft 22, from that to which the handle is attached, is provided with a fly-wheel as shown at 24. This power shaft is equipped with a beveled gear 25 which meshes with a beveled pinion 26 carried at one end of the stud shaft 27, this shaft extending through the back plate 3, and at its opposite end is provided with a gear wheel 28 meshing with the gear pinion 29, the latter in turn meshing with and driving the gear wheel 30 mounted upon the shaft 31 which carries the shutter S. The result is that when the power shaft is turned, motion will be transmitted through the train of gearing just described to the shutter S to swing the same across the shutter opening at predetermined times, thus opening and closing the shutter as may be desired.

Furthermore, connected to the intermediate portion of this power shaft 22, and driven therefrom, is the eccentric connecting rod 32 which is also loosely connected to the rod 33 fixed to the sliding cross-bar 34. This cross-bar 34 in turn is connected with the U-shaped sliding plate 35 at the opposite side of the plate 3 through the medium of the tongue 36, this tongue 36 passing through the elongated slot 37 of the plate 3. As will be seen by reference to Fig. 6, the two arms 38 of the plate 35 slide along the front face of the back plate 3, one at each side of the shutter opening, and, in order to maintain the sliding plate 35 in proper alinement, a guide roller 39 is employed which is mounted in suitable bearing brackets 40. In order to substantially fill the space between the upper ends of the arms 38, and thereby prevent the entrance of light beneath the roller 39, I provide a suitable filler block 41 which is bolted, as at 42, to the front face of the back plate, the lower end of this plate projecting between the two arms 38 and beneath the roller so that at this point, the camera is made substantially light tight.

Furthermore, it will be noted, that the segmental shutter S in its opening and closing movement swings in a path across the outer face of the sliding plate. A plate 43 is also employed to cover and act as a support or bearing for the shafts of the gear 28, the pinion 29 and the gear 30.

Each arm 38 of the sliding plate 35 is formed with a lug 44 which is adapted to project through an adjacent elongated slot 45 in the back plate 3. These slots 45 lie one at each side of the shutter opening as is shown in Fig. 4, and these lugs not only act as a guide for the arms of the plate in its vertical sliding movement, but each of these lugs is also adapted to be contacted with by a film clamping foot 46. As will be understood by reference to Fig. 4, I employ a pair of these clamping feet, or one at each end of a clamping arm 47. Each clamping arm 47 is pivotally mounted or fulcrumed intermediate its end on the rod 33 carried by the sliding bar 34. Each clamping foot is provided with a contracting spring 49 which normally tends to draw the foot downwardly into contact with the lug 44 therebeneath, so that when a film is passed between the pair of clamping feet and the lugs such film will be clamped at its edges between the feet and the lugs on the arms 38 of the sliding plate 35. The result will be that when the power shaft is turned and the film is so clamped, the plate 35 will be shifted and the clamping arms will draw the film down past the shutter opening. When the film is thus moving it is to be understood that the shutter will be closed, while, when the film is stationary the shutter will be open. In order to release the clamping action of the clamping feet and consequently permit the film to remain stationary for exposure, I provide upon the power shaft 22 a pair of eccentric cams 50 which cams are adapted to bear against the rear ends 51 of the arms 47, and depressing these rear ends of the arms cause the clamping feet 46 to be raised from contact with the film, as indicated on dotted lines in Figs. 9 and 10. By reference to these figures it will be seen that when the toes of the cams bear against the rear ends 51 of the clamping arms, such rear ends will be depressed and the front or foot carrying ends of the arms will be raised against the tension of the springs 49, while, when the toes of the cams have released their pressing action upon the pressing arms and the heels of the cams are riding over the arms the depressing action being released, the springs will again draw the clamping feet into clamping engagement with the film.

Carried by the brackets 52 is a shaft 53 upon which is fixed the gear-wheel 54, the latter meshing with the pinion 55 on the drive or power shaft 22. The opposite end of the shaft 53 is provided with a pulley 56 over which travels the endless belt 57, this belt also training over the pulley 58 carried by the shaft 8' of the lower spool 8. When it is desired to obtain a relatively high speed in the movement of the shutter, as in taking pictures, the detachable handle $h$ may be attached to the shaft 53 and the latter operated to drive the lower spool 8 and wind the film upon the latter, while, when it is desired to use a relatively low speed, the handle $h$ may be connected directly to the end of the power shaft 22.

From the above description taken in connection with the accompanying drawings it will be seen that I have provided a simple, yet efficient film feeding mechanism which is adapted to engage and feed a film past the shutter controlled opening, for the desired purpose. In this connection it will also be noted that, if desired, an imperforate film such as partially shown in Fig. 9 may be employed and by avoiding the use of perforations in the edge of the film and the star or sprocket wheel for moving such film, I obviate the liability of the film being torn or otherwise injured as frequently occurs with the usual perforated film.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claims.

What I claim is—

1. A film feeding mechanism, including co-acting elements, arranged adjacent the opposite side edges of the film to grip the same by flexing portions thereof at predetermined times, and means for reciprocating said elements.

2. A mechanism for feeding imperforate films, including two reciprocating elements adapted to intermittently engage opposite side faces of the film at the opposite side edges, to grip the film by flexing portions thereof for the feeding action, and means for reciprocating said elements.

3. In a mechanism for feeding imperforate films, the combination with a power shaft, of a sliding plate with spaced projections, said sliding plate being connected with and operable from the power shaft, and a pair of pivoted film-engaging members also operable from the power shaft for intermittently clamping portions of the film against said projections.

4. In a mechanism for feeding imperforate films, a reciprocating plate having spaced projections, said projections having transverse grooves in the film contacting faces thereof, a pair of pivoted clamping members operating in conjunction with the grooved projections for gripping and moving a film, and means for reciprocating the plate and actuating the clamping members.

5. In a mechanism for feeding imperforate films, the combination of a movable plate having spaced projections with grooved film-engaging faces, a pair of spaced pivoted clamping members adapted to engage the film at the opposite side edges thereof and operating in conjunction with the projections for clamping and moving the film by flexing portions thereof, a power shaft, connections between the power shaft and the plate, and means carried by the power shaft for actuating the clamping members to move the latter into and out of engagement with the film.

6. In a photographic apparatus, and in combination with a wall of the apparatus, a member located at one side of the wall and having spaced projections extending through slots in the wall, a pair of spaced pivoted arms having clamping feet adapted to engage the film at opposite side edges thereof to clamp the same against the projections, a power shaft, power transmission means for imparting motion from the power shaft to the member to move the latter, and means operable by the power shaft for actuating the arms to disengage the clamping feet from the film.

7. A device for feeding imperforate films including a reciprocating member having spaced projections with grooved film-engaging faces, a pair of spaced swinging clamping members having clamping feet adapted to clamp the film by flexing portions thereof out of the main body of the film into the grooves in said projections, and means for imparting motion to the clamping members and the reciprocating members.

8. In a mechanism for feeding imperforate film, the combination of a reciprocating member having spaced projections with grooved film-engaging faces, spaced pivoted clamping members having clamping feet operating in conjunction with said projections for flexing and clamping portions of the film at the opposite side edges thereof and for moving said film, a power shaft, power transmission connections between the power shaft and the reciprocating member for moving the latter, and means including cams carried by the power shaft for actuating the clamping members to move the latter into and out of engagement with the film.

9. In a mechanism for feeding imperforate film, the combination with a sliding plate having grooved projections, of fulcrumed clamping arms having clamping feet operating in conjunction with the projections to flex and clamp portions of the film at the opposite side edges thereof, a power shaft, a crank connection between the power shaft and the plate for sliding the latter when moving the film and cams on the power shaft adapted at predetermined times to disengage the clamping arms from the film.

In testimony whereof I have hereunto set my hand in the presence of two subscribing witnesses.

HENRY CSANYI.

Witnesses:
 RICHARD B. CAVANAGH,
 CHRISTINE KRELLWITZ.